United States Patent

[11] 3,575,669

[72] Inventor Andrew V. Haeff
 Los Angeles, Calif.
[21] Appl. No. 737,722
[22] Filed June 17, 1968
[45] Patented Apr. 20, 1971
[73] Assignee TRW, Inc.
 Redondo Beach, Calif.

[54] CHEMICAL LASER APPARATUS
 4 Claims, 8 Drawing Figs.
[52] U.S. Cl. .................................................. 331/94.5
[51] Int. Cl. .................................................. H01s 3/00
[50] Field of Search .......................................... 331/94.5

[56] References Cited
 UNITED STATES PATENTS

| | | | |
|---|---|---|---|
| 3,241,085 | 3/1966 | Marcatili | 331/94.5 |
| 3,299,368 | 1/1967 | Klebba | 331/94.5 |
| 3,302,127 | 1/1967 | Lin | 331/94.5 |
| 3,464,028 | 8/1969 | Moeller | 331/94.5 |
| 3,509,486 | 4/1970 | Patel | 331/94.5 |

OTHER REFERENCES
"High Power Gas Laser Studie" Irwin Wieder
"Effect of a Heated Platinum Wire on a Sealed CO 2 Laser System" Taylor et al; 1967
"On The Feaseability of Flame Lasers;" Bleekrosle et al; 1964.

Primary Examiner—Ronald L. Wibert
Assistant Examiner—Conrad Clark
Attorneys—Daniel T. Anderson, Edwin A. Oser and Jerry A. Dinardo ABSTRACT: The present invention relates to an apparatus and process for achieving amplification of radiation from an excited, chemically reacting mixture by initiating chemical reaction of the mixture adjacent to an optical cavity and quickly flowing the mixture transversely through the cavity while the radiation interacts with the excited molecules of the mixture. Tuning and focusing of the optical cavity or the reflection chamber is effected by varying the placement and curvature of cavity defining reflectors. Output light energy is removed from the optical cavity by a separate reflector selectively movable into the path of the reflecting radiation.

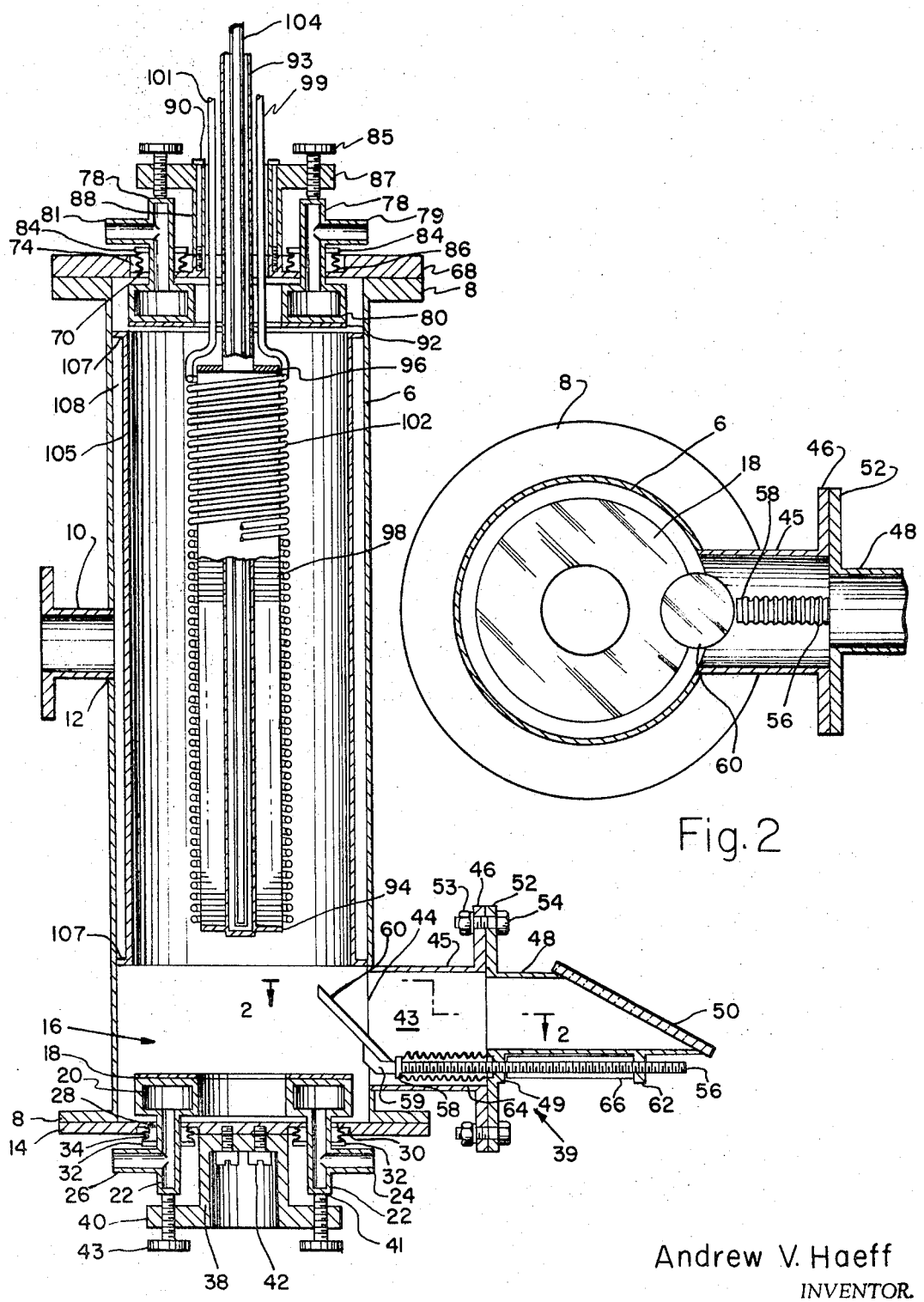

Andrew V. Haeff
INVENTOR.

BY
Daniel T. Anderson
ATTORNEY

Andrew V. Haeff
INVENTOR.

BY
Daniel T. Anderson
ATTORNEY

CHEMICAL LASER APPARATUS

BACKGROUND OF THE INVENTION

A thermal light source, such as a flame or an incandescent lamp, spontaneously emits light as photons possessing no wave coherence and covering a wide range of frequencies. This is due to the continuous, collisional excitation of the atoms and molecules which spontaneously release energy as photons substantially without influence by and independently of the photons emitted by any other atom or molecule.

However, the radiation of photons in large populations of excited atoms and molecules can, in accordance with modern laser technology, be synchronized to preserve frequency, phase and direction; and markedly directional, monochromatic and coherent narrow beams of light can be obtained. Such stimulated emission of radiation is obtained by passing photons through a medium which contains nonequilibrium populations of either electronically, vibrationally, or rotationally excited atoms or molecules; and the approach of a photon of predetermined wavelength passing through the medium stimulates an excited atom or molecule to emit an additional photon precisely in phase with the approaching photon. In a medium with a large population of excited atoms, the process is progressive and the cascade of emissions which results may be further augmented by reflecting the emitted photons back through the population until an increasingly intense light beam is produced.

Atoms or molecules of the desired medium may be considered as having a preponderance of their population in a low energy ground state in which they absorb rather than emit energy of the preselected wavelength. To achieve the desired stimulated emission, there must be a population inversion or an excess of atoms or molecules in an upper or excited state so that the emission process, whereby the excited population state returns to normal, predominates. This is achieved in a general sense by pumping energy into the population of atoms or molecules. In the initial development of this art, an intense light beam was used as the energy source and, later, electron bombardment was utilized to form the excited population state as by ionizing the atoms or changing the energy level of their atomic electrons. Though considerable power and efficiencies associated with lasers have been obtained by such electron bombardment techniques, the overall efficiency of the pumped systems is still relatively low. For example, the carbon dioxide-nitrogen-helium gas laser is excited by an electrical discharge dissipating power of the order of hundreds of watts, at the wavelength of 10.6 microns with an efficiency of only about 16 percent. It is even less when the power consumption of a thermionic cathode is considered in computing the overall efficiency. Furthermore, the overall bulk and weight of the system including the input energy source is fairly large.

More recently there has been considerable interest in directly utilizing the energy released in making and breaking of chemical bonds as the energy source for stimulated emission of radiation. Extremely high efficiencies are possible in theory since certain chemical reactions produce predominately or exclusively excited species. The bulky external energy source is not necessary and little or no outside energy is required in most reactions; and others are simply initiated by a pulse of light or a spark.

On initiation, the chemical reaction proceeds to produce, intrinsically and continuously, species in different states of excitation. These excitation states in increasing order of energy required for their formation and, correspondingly, in decreasing order of the energetic level of radiation are electronic, vibrational, rotational, and translational. The energy which is released as translation of the product away from one another or as rotation about their centers of mass is quickly dissipated and can be regarded as heat; that is, the rotationally and translationally excited species do not emit radiation useful in laser processes. On the other hand, the products produced in states of electronic and vibrational excitation exist for a sufficient time interval and can otherwise be useful in stimulated emission processes.

It is not sufficient merely to have a greater population in the upper excited state of the two energy levels. There must be a population difference, sufficiently great, to make up for any losses of photons escaping the sides or ends of the particular cavity or those absorbed by the reflector being used. This condition can be fulfilled by providing an excess of the higher energy excited reactants or by a deficiency of the lower energy level species.

However, most excited species contain a hierarchy of energy levels including the electron levels containing closely spaced vibrational sublevels and the vibrational levels containing closely spaced rotational sublevels. The energy is initially broadly distributed in equilibrium between the many levels. Furthermore, the relaxation or decay of the excited species due to radiative and collision induced transitions "fall" to lower vibrational levels with the result that the excited states left to cascade down the energy strata structure tend to collect in larger and larger pools in each successive level. As a result of regenerative stimulated emission, the time scale of relaxation is further shortened. All these factors impose a severe requirement on the rate of formation of excited atoms or molecules to maintain sufficiently. the population of a particular higher energy level to sustain a desirable or useful rate of stimulated emission. Moreover, the removal rate of the lower state species by collisional or radiative processes may be slower than the preceding or upper level relaxation rate. Buildup and saturation of the ground state level is difficult to avoid in a long reaction tube since the amplifying medium, i.e., the radiating reacting mixture, will be present in the vessel for a significant interval. Failure to supply the excited reactants in a sufficient number before relaxation or failure to depopulate or remove the lower state can destroy the particular nonequilibrium condition necessary for stimulating emission of radiation.

BRIEF SUMMARY OF THE INVENTION

Briefly, our example of the radiation amplification chemical apparatus of the invention comprises an elongate substantially closed vessel receiving a radiating, chemically reacting mixture flowing transverse to an optical cavity formed by a pair of mutually aligned reflectors transversely mounted in the vessel for repetitively reflecting the radiation back and forth through the mixture.

A flow of reactants is delivered to an elongate reaction initiating assembly disposed adjacent the optical cavity, and the reacting mixture is rapidly removed from said cavity by an elongate exhaust member disposed in said vessel. Optional auxiliary gases are introduced by an elongate multiple supply member mounted between the initiating assembly and the cavity.

In this example, a means for cooling the optical cavity reflectors may be provided and take the form of a hollow housing receiving a flow of heat exchange fluid. Advantageously, this structure may also be used as an adjustable support for the reflectors. A variable radiation coupling output is provided separate from the optical cavity reflectors in the form of an additional reflection member selectively varying the amount of radiation withdrawn from said vessel.

The present invention is directed to reducing significantly the limitations on the ability to bring reacting mixtures to sufficiently high population differences or inversion densities for promoting gain in the emission of light radiation. In the invention, radiation is reflected through an excited population by providing for a high flow rate of a large volume of highly excited reactants transversely and radially across a reflecting chamber before the excited reactants can relax. The reactants are at their highest population inversion state, because initiation of the reaction is not effected until the reactants are immediately adjacent the optical cavity.

A further manner of influencing the population difference is by the addition of certain auxiliary substances to the reaction mixture. The present invention provides for very efficient utilization of such substances since the auxiliary materials are not added to the system until their effect is desired, thereby avoiding waste of the chemical materials and allowing maximum atomic population differences. In the apparatus of the invention, any auxiliary materials, usually in gaseous state, are added to the excited mixture just after initiation of reaction except in the case where the auxiliary material is a secondary reactant of the excited mixture, in which case mixture with the primary reactant effects initiation of the reaction. The materials are added immediately adjacent the optical cavity in an elongate multiple manner so that they join the reaction mixture quickly flowing transverse to the optical cavity.

Furthermore, since the auxiliary material is not present in the reaction mixture before or during reaction, it allows for more effective excited species replacement rates since the reactants are more concentrated without the additional substance; and higher undiluted volumes are brought to the chamber. Higher populations of excited reactants are possible since in the higher concentrated mixtures there is greater cross section for the individual atoms and molecules to collide with each other and react.

The present inventive apparatus may readily be made capable of minute and variable internal tuning of the optical cavity and focusing of the output beam width by means of adjustable reflectors which are internally adjusting the curvature of the reflectors. In addition, continuous focusing may be achieved automatically in accordance with the invention.

Curvature changing may be accomplished in this invention by noncomplex adjustment means. Such control permits ready change of the beam intensity and beam width which is advantageous in many applications such as surgical operations where variable thickness tissue is being severed by a laser beam. The larger, heavier and more complex lens focusing systems of the prior art need not, therefore, be utilized.

Furthermore, according to the invention, the output signal may be removed completely separately from the reflectors so that the reflectors can be totally reflecting and thus favor and promote the initial gain in radiation while obviating escape of radiation from the cavity during the initial moments when the reflecting radiation is being amplified to the threshold of oscillation. The output means is capable of variable coupling with the radiation in the cavity from zero to maximum, again providing means for varying the intensity of the output beam.

Further details of these and other novel features of the invention and their principles of operation as well as additional objects and advantages of the invention will become apparent and be best understood from a consideration of the following description when taken in connection with the accompanying drawings which are all presented by way of illustrative example only.

BRIEF DESCRIPTION OF THE DRAWINGS

FIG. 1 is a sectional elevation view, partly broken away, illustrating a first embodiment of the radiation amplification chemical apparatus of my invention;

FIG. 2 is an enlarged fragmentary view taken along lines 2-2 of FIG. 1 illustrating the variable coupling output means;

DESCRIPTION OF THE PREFERRED EMBODIMENTS

Figure 3:
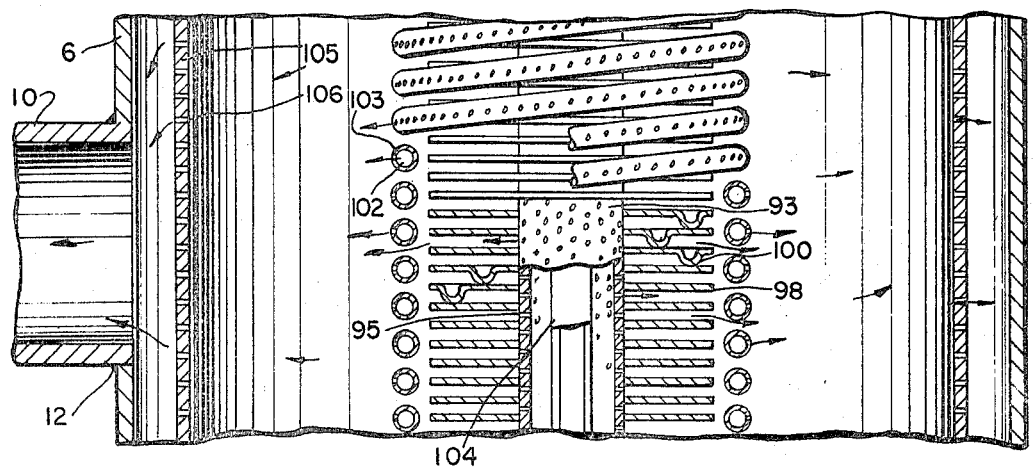
FIG. 3 is an enlarged fragmentary section elevational view illustrating the details of the reactant feed assembly of FIG. 1.
Figure 7:
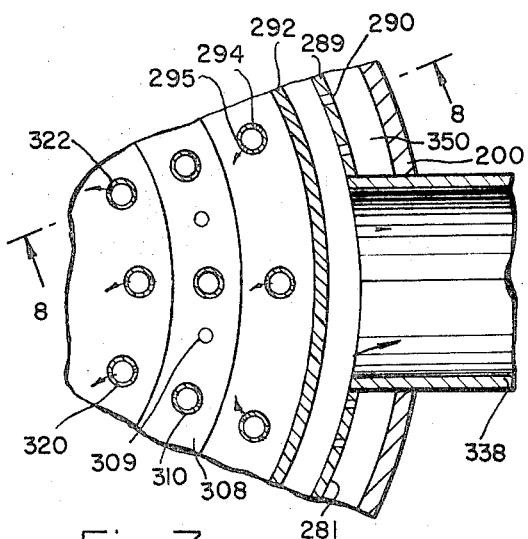
FIG. 7 is an enlarged fragmentary view of the details of the apparatus illustrated in FIG. 6.

With specific reference now to the FIGS. in detail, it is stressed that the particulars shown are by way of example and for purposes of illustrative discussion only and are presented in the cause of providing what is believed to be the most useful and readily understood description of the problems and structural concepts of the invention. In this regard no attempt is made to show structural or operational details of the apparatus in more detail than is determined necessary for a fundamental understanding of the invention. The descriptions, taken with the drawings, will make it apparent to those skilled in the chemistry and laser arts how the forms of the invention may be embodied in practice. Specifically, the detailed showing is not to be taken as a limitation upon the scope of the invention, which is defined by the appended claims forming, along with the drawing, an integral part of this specification.

In FIGS. 1—4 an example of the apparatus of a first embodiment includes a substantially closed vessel for receiving a radiating chemically reacting mixture and an exterior cylindrical casing 6 terminating at each end in an external cylindrical flange member 8. An outlet exhaust member 10 is connected to the casing at 12; and the ends of the casing are closed by a bottom plate 14 and a top plate 68 attached to the respective flanges 8.

The bottom reflector assembly comprises, in this example, a reflector 18 supported on a hollow, annular, cylindrical member 20 which communicates with and is connected to two vertical hollow cylindrical stems 22 forming a water cooling circuit. Water is fed to an inlet branch 24 and removed through an outlet branch 26 connected to the respective cylindrical stems. The bottom plate 14 is provided with enlarged stem receiving apertures 28 each surrounded by a larger outer recess 30 receiving each cylindrical stem 22 therethrough. Each cylindrical stem 22 has a disc member 32 attached thereto, below the recess, forming a chamber for a compression bellows 34 which is attached to the disc member and to the bottom of said recess. The bellows seals the aperture and biases the reflector 18 away from the vessel. An inverted cylindrical T-shaped member 38 has a horizontal extension 40 and is attached to the bottom plate 14 by screws 42. The horizontal extension 40 contains threaded recesses receiving set screws 43 which engage the closed bottom 41 of each cylindrical stem. The height and angular placement of the reflector 18 is varied by movement of the screws 43 to increase or decrease the biasing force of the bellows 34.

The top reflector assembly is supported by a cylindrical top member 68 having enlarged apertures 70 each terminating in an outer larger bore 74 receiving the vertical reflector adjusting and cooling conduit stems 78. The stems are connected to the annular, cylindrical, cooling and supporting chamber 80 having a reflector 92 attached thereto. The cooling stems 78 again have a disc, stop member 84 attached thereto below the coolant inlet 79 and outlet 81 members. A compression bellows 86 is attached between each stop member 84 and bore 74. Adjusting screws 85 are received in the threaded recesses of the flange extension 87 of a T-shaped cylinder member 88 above the closed end of each stem. This member 88 is attached to the top plate 68 by elongated bolts 90. The reflector 92 is variably adjusted as discussed above so as to be mutually aligned with the reflector 18 to form a radiation reflecting, optical cavity.

The cavity may preferably be tuned whereby the resonant mode of the structure favors the dominant emission so that the gain of passes between the reflectors builds up until the optical field is strong enough to complete with spontaneous decay of the other atoms whose center wavelengths are within a natural width of the mode. This width of the mode, i.e., the distance between the reflectors, must be maintained to preserve resonant standing waves of radiation at the frequency of the transistion between the energy levels. The reflectors need not be planar but can both be confocal spherical elements; or one may be planar and the other spherical. In addition, the reflectors may be coated with materials that absorb nonresonant radiation.

The adjustable reflectors of this example of the invention provide a convenient manner of focusing, initial tuning, and maintaining in tune the optical cavity of an apparatus for the stimulated emission of radiation. This is especially important in a high-temperature apparatus so as to be able, during operation, to compensate for thermal expansion causing a change in the width of the mode.

The cooling of the reflectors further minimizes the tendency of the hot gases to cause undue thermal expansion of the reflectors or to distort or destroy the crystalline reflector surfaces. The hollow coolant receiving supports aid in cooling the ends of the apparatus and in controlling thermal expansion and binding or jamming of the associated adjustment means. Also, manual adjustment of the reflector is permitted by maintaining the adjustment set screws at a comfortable temperature level.

The variable coupling radiation output includes an output aperture 44 in the cylindrical casing 6 communicating with an output coupling chamber 43 the first part of which is formed by a cylindrical extension 45 connected at one end to the casing 6 at the aperture 44. The opposite end terminates in a radially extending exterior flange member 46. The output end of the coupling chamber is formed by a truncated cylinder 48 having its outer truncated end sealed with a window 50 which is transparent to the emitted radiation. In the case of infrared output in the range of 10.6 microns as with a $CO_2$ laser, the window is advantageously formed of rock salt and is positioned at the Brewster angle for maximum transmission. External mirrors, not shown, are used for directing and focusing the light beam output.

The truncated cylinder 48 is of smaller diameter than the cylindrical extension 45 and is mounted in a flange 52 having the same exterior diameter as the flange 46 on the cylindrical extension 45. The truncated cylinder 48 is, in this example, mounted centrally with respect to the horizontal but vertically off center a distance approximately equal to the difference in diameters between the cylinders 48 and 45. When the flanges 46 and 52 are abutted with the shorter extension of flange 52 at the top, the cylinders are essentially in alignment at the top but cylinder 48 is above cylinder 45 at the bottom, thusly forming a shoulder 49 in flange 52 which faces the exterior of the apparatus. The flanges 46 and 52 are connected by nuts 53 and screws 54.

The means for selectively varying the amount of radiation withdrawn from the vessel comprises an elongated threaded member 56 terminating in a disc stop member 58 and a mirror supporting extension 59 having an elliptical disc mirror 60 attached thereto at a suitable radiation reflecting angle which typically is 45°. The threaded member 56 is received through a nonthreaded aperture in the shoulder 49 and through an aligned nonthreaded aperture in a vertical projection 62 provided further down the truncated cylinder 48 toward the window. The portion of the threaded member between the stop member 58 and the shoulder 49 is enclosed by an attached compression bellows 64 which seals the aperture in the shoulder 49 and prevents rotation of the threaded member 56. The portion of the threaded member 56 between the outer side of the shoulder 49 and the vertical projection 62 is surrounded by a threaded collar member 66 which acts as an output coupling adjusting knob, whereby, on turning the knob, the horizontal projection of the mirror 60 into or out of the optical cavity chamber and, consequently, the degree of coupling from the reflecting radiation in the optical cavity can be selectively varied.

Figure 4:
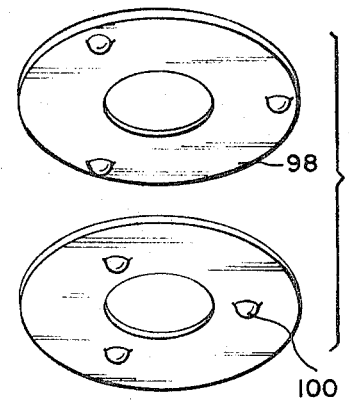
FIG. 4 is a perspective view of the spacing of two catalyst discs used in the embodiment of FIG. 1.
Figure 8:
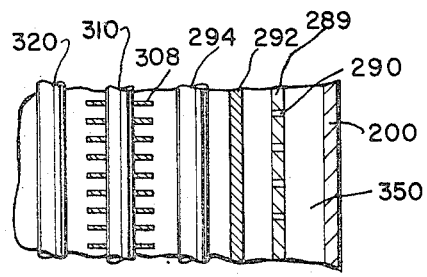
FIG. 8 is a sectional view taken along lines 8–8 of FIG. 7.
Figure 6:
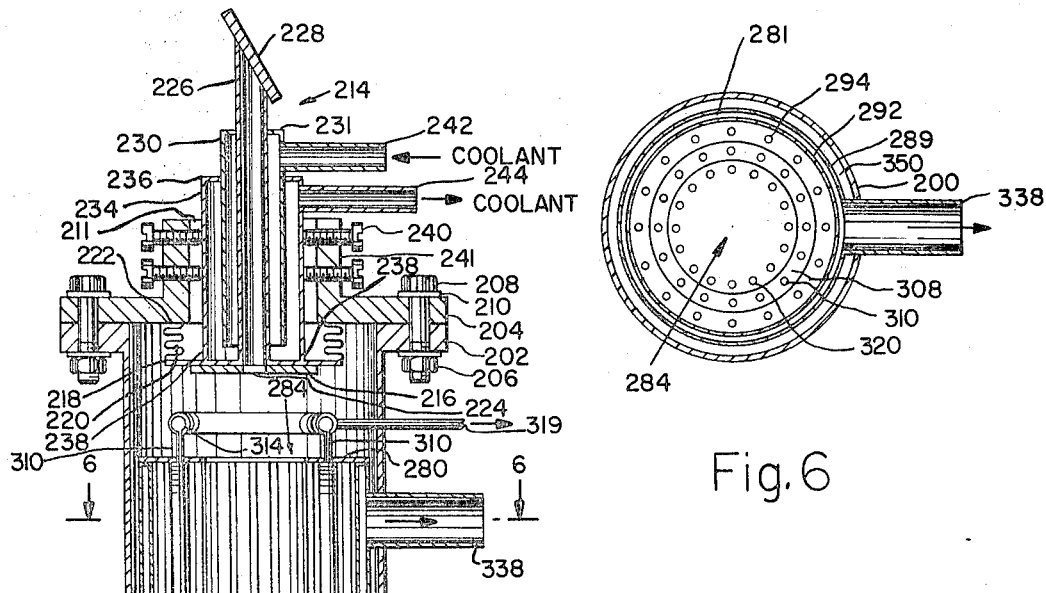
FIG. 6 is a sectional view taken along lines 6–6 of FIG. 5.

The top plate 68 and the mirror 92 centrally receive and support, in this example, a plurality of reactant conduits. Referring particularly to FIGS. 3—4, a foraminated reactant supply conduit 93 containing openings 95 has attached, at its bottom, a cylindrical end plate 94 and, at its top, an annular top plate 96. Surrounding the length of the supply conduit between these plates are disposed the initiating assembly comprising a plurality of closely spaced thin discs 98 of a catalyst. These may be copper discs stamped out in the form of flat annular rings and spaced by means of nonaligned embossed projections such as dimples 100. The auxiliary supply means is shown surrounding the exterior of the catalyst column as a quite tightly wound spiral of perforated tubing 102 containing radially outwardly directed perforations 103. The inlet port 99 and outlet port 101 of the spiral of tubing 102 are shown extending through the mirror 92 and the top plate 68. A closed end pipe 104 is received in the interior of the perforated supply conduit 93 and is utilized to cool the reactant gases to retard or prevent any reaction along the length of the supply tube before the reactive gases pass over the catalyst discs 98 as well as to control or prevent undesired thermally induced reactions when the gases pass over the catalysts. The interior of the casing above the output extension arm is, in this example, enclosed by an exhaust cylinder comprising a cylinder 105 containing perforations 106 and being connected to the outer casing 6 by suitable attachment of flanges 107.

In one mode of operation, the catalytically reacting gases are fed to the perforated supply conduit 93 while coolant water is circulated in the closed end pipe 104 and auxiliary gases are fed to the perforated spiral tubing 102. Cooling of the mixture, as indicated above, inhibits reaction until the mixture, limited in vertical flow by the top and bottom plates 96 and 94, diffuses through the perforations 95 in the input conduit 93 along the length thereof and the mixture flows in a radially outward direction over the upper and lower surfaces of the catalyst discs 98. The excited reacting mixture is then mixed with an auxiliary gas at the exterior of the catalyst column and is diffused out of the perforations 103 in the spiral tubing 102. It then enters the optical cavity, and the reflecting radiation passes through the chemically excited mixture. The mixture continues the radially outward flow as its molecules decay from their excited populations by radiation of photons coherent with the initiating, reflecting radiation. The chemical reaction products are then removed from the chamber through the perforations 106 of the exhaust cylinder 105 into the annular space 108 from whence they are removed through the outlet exhaust member 10 which may be connected to a source of vacuum, not shown.

Some of the radiation emitted by the excited chemical reactants travels axially along the cavity and is repeatedly reflected by the mutually aligned reflectors 18 and 92. The successive passes of the radiation through the continuously introduced excited mixture effects the desired gain in the light energy. The effective, overall gain may be enhanced by the action of the reflector cooling circuits and the careful focusing and aligning of the reflectors by means of the set screws 43 and 85. Such efforts are directed toward obtaining maximum repetitive reflection and lasing regenerative interaction between the excited populations and the coherent radiation.

After oscillation is initiated, the output mirror 60 may be externally adjusted by turning the collar 66 so that the mirror 60 is moved into coupling association with the oscillating radiation, and a desired magnitude output of light is obtained through the window 50. Several of these adjustable coupling output mirrors can be arranged around the periphery of the optical cavity if more than one output is desired.

Referring now to FIGS. 5—8, there is shown an example of an alternative embodiment differing in the relative positioning of the reactant supply and the reflecting and output means. Also illustrated are further features relating to means for cooling the catalyst column and for aligning and changing the curvature of the reflectors.

The reactant supply and initiating means in this example are mounted near the outer periphery of the vessel surrounding an optical cavity defined by mutually aligned, cooled and adjustable reflectors supported on housings. These housings are associated with the radiation output and alignment means. The column of thin discs may act as heating fins for thermal initiation or as catalytic agents for catalytic initiation as will be discussed in more detail below.

This embodiment also includes a reactant (for amplifying and radiating) receiving closed vessel comprising an outer cylindrical casing 200 terminating in exterior top and bottom flange members 202 and by a top member 204 and a bottom member 246. An inverted T-shaped top member 204 is, in this example, connected, by nuts 206, screws 208, and washers 210, to the top flange 202 providing a vertical cylindrical cavity 211 for receiving the reflector and output assembly 214. The reflector and output assembly 214 includes a series of concentric hollow cylindrical members. A reflector 216 is attached to a horizontal cylindrical mounting plate 218 which is sealed from the reaction chamber and is biased downwardly by means of a compression bellows 220 attached at its outer periphery to the plate and to the inside of the top member 204 at 222.

A light output aperture 224 is centrally provided in the reflector 216 and its mounting plate 218. An output cylinder 226, shown upright, is connected to the mounting plate aperture. The output cylinder 226 terminates in a top portion which may be truncated at the appropriate Brewster angle for an output window 228 attached thereto.

An open bottom cylinder 230 for baffling heat exchange fluid against the output cylinder 226 surrounds the cylinder; and its top 231 is connected thereto below the reflector 228. The open bottom 232 terminates a distance above the reflector mounting plate 218. A further outer cylinder 234 surrounds the open bottom cylinder 230 and is connected at its top 236 to the open bottom cylinder 230 and at its bottom 238 to the reflector mounting plate 218.

A plurality of set screws 240 are provided in threaded bores in the upright cylinder portion 241 of the top member 204 and bear against and support the outer cylinder 234 in the cylindrical cavity 211. By means of the set screws 240 and the compression bellows 220, the position of the reflector 216 may be adjusted vertically, horizontally, and in combinations thereof.

A coolant supply conduit 242 is, in this example, connected to the open bottom cylinder 230; and a coolant outlet conduit 244 is connected to the outer cylinder 234. The coolant flows first through the open bottom cylinder, around the light output cylinder, across the mounting plate, upwardly around the outer annular channel, and is finally removed through the outlet pipe.

Similarly, to the bottom flange 202 of the cylindrical casing 200, a T-shaped bottom plate member 246 is shown attached by nuts 206, screws 208, and washers 210. A reflector 248, mutually alignable with the reflector 216 to form an optical cavity, is mounted on the plate 250 which is sealed and biased by a compression bellows 252 attached to the outer periphery of the plate 250 and to a raised shoulder 254 on the interior of the bottom plate 246.

The reflector 248 may advantageously be coated with a crystalline layer 274 such as barium titanate which deforms by crystal strain to change the curvature of the mirror surface when an electric potential of selected magnitude is impressed across the layer by lead wires 276 connected to the layer and to a variable source of potential 278. This provides a completely internal means of variably adjusting the curvature of a reflector which is, in accordance with the present invention, utilized to compensate for thermal expansion of either of the reflectors and to focus and intensify the output beam being removed through the opposite reflector.

In many applications, such as the surgical use of a laser beam, it is of great advantage to be able simply to vary and adjust the width and intensity of the beam without recourse to cumbersome external lens focusing systems.

A small central aperture 256 is provided in the reflector 248 and the mounting plate 250 for alignment purposes. A central alignment tube 258 is connected to the aperture 256 in the mounting plate and extends downwardly terminating in a window 260. This tube is again surrounded by a series of concentric cylinders, the first being a cylinder 261 with an open end 262 terminating below the mounting plate and with the closed bottom 264 being connected to the lower portion of the central alignment tube 258. This cylinder, in turn, is surrounded by a larger outer cylinder 266 connected at its bottom 268 to the open end cylinder 261 and at its top 269 to the mounting plate 250. An inlet connector 270 is provided on the open end cylinder 261 and an outlet connector 272 is provided on the outer cylinder 266. The flow of cooling water may be the same as described above.

A plurality of set screws 240 provided in the threaded bores of cylinder 275 bear against and adjustably support the outer cylinder 266 of the mirror assembly in the cavity 277.

A series of supply conduits and a catalyst column are mounted adjacent the outer circumference of the central optical cavity between an upper cylindrical plate 280 and a lower cylindrical plate 282, each having a central optical cavity passage 284.

Figure 5:
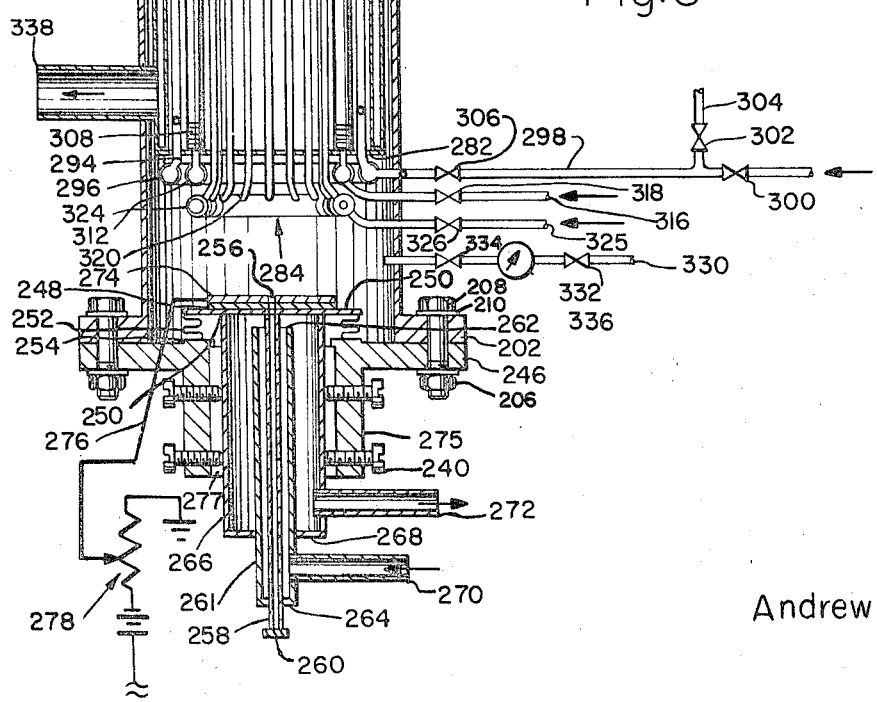
FIG. 5 is a sectional elevation view illustrating an alternative embodiment of the apparatus of my invention.

An annular exhaust cylinder 281 is, in this example, spaced from the casing 200 and is closed at each end by the plates 280 and 282 (FIG. 5). Its exterior wall 289 contains a plurality of small openings 290, while its interior wall 292 is solid. Radially adjacent the exhaust cylinder 281 (FIG. 7) are shown a series of upright reactant supply conduits 294 arranged in a circular pattern defined by a manifold supply ring 296. Each of these conduits contains radially directed perforations 296 provided along the interior length thereof and each terminates in the upper plate 280. The other end of each of these conduit members extends through the lower plate 282 and terminates in the supply ring 296. A reactant supply conduit 298 extends through the outer wall of the casing 200 and connects to the supply ring 296. A supply conduit 298 leading to the casing 200 contains a first valve 300, a second valve 302 interposed in a branch 304, and a third valve 306 interposed before entry to the casing.

Adjacent the circular series of inlet reactant conduits is shown disposed a series of thinly spaced annular discs 308 (FIG. 8) forming a catalyst, or heat exchange, column extending between the upper and lower plates 280 and 282. These discs 308 may each contain spaced, embossed dimples 309. A series of upright, nonperforated heat exchange tubes 310 connects to an inlet ring 312, extends through this stack of discs, extends through the upper plate 280; and each is connected to an outlet collecting, manifold ring 314. An inlet conduit 316 containing a valve 318 extends through the casing 200 and is connected to the inlet manifold ring 312. Similarly, an outlet conduit 319 extends through the casing and connects with the collecting mainfold ring 314.

Next adjacent the column of discs and immediately adjacent the optical cavity is shown, in this example, the auxiliary supply means comprising a further series of vertical tubes 320, each provided with radially inwardly directed openings 322. These tubes 320 terminate in the upper plate 280, extend through the lower plate 282, and are each connected to an auxiliary gas inlet manifold ring 324. An inlet feed conduit 325 provided with a valve 326 extends through the outer casing and is connected to the manifold ring 324. A further conduit 330 extends into the casing and includes valves 332 and 334 on each side of a pressure indicator gauge 336. A series of outlet pipes 338 (FIG. 6) extends through the outer casing 200 and is connected to the outer perforated wall 289 of the annular exhaust cylinder 281. These outlet pipes 338 may be distributed angularly about the cylinder to provide more support for the vertical reactant feeding means assembly.

In a typical mode of operation of this example, the valves 300, 302 and 306 (FIG. 5) are open. The reactant gases are fed to the conduit 298 and its branch 304 from a source not shown and are distributed from the manifold ring 296 to each perforated pipe 294 from whence they flow centrally and radially out of the perforations 295 over the upper and lower surface of discs 308. Air or other heat exchange fluid is fed to the conduits 316 through the supply valve 318 and through the manifold ring 312 and the heat exchanger tubes 310, thereby cooling or heating the discs, as desired, before being collected in the manifold ring 314. The heat exchange fluid is then exhausted through the outlet conduit 319.

Auxiliary gas may be fed to the auxiliary inlet conduit 325 and through the inlet valve 326. This gas is then distributed to each of the perforated pipes 320 from whence it flows out of the openings 322 and mixes with the radially flowing reacting mixture. The valve 334 is opened and the valve 332 is closed on conduit 330 when a reading is to be taken from the pressure indicating gauge 336.

A source of vacuum is connected to the outlet pipes 338 and resultant flow through the openings 290 in the outer wall 289 of the annular exhaust cylinder exhausts the reaction products out of the central cavity 284 into the outer annular cavity 350. Then the gases enter the annular exhaust cylinder through the openings 290 and are drawn out of the device through the outlet pipes 338.

For lasing action, the reflectors are aligned and focused by use of the central aligning tube 258 coupled to the lower mirror 248 and by adjusting the placement of the reflectors by set screws 240 and by varying the curvature of the bottom reflector 248 with a suitable voltage impressed across the crystal layer 274. A flow of cool water may be maintained through each reflector cooling circuit for concurrently cooling the reflectors, the light output and alignment tubes, and the adjustable reflector support assemblies. Output radiation is transmitted through the window 228 which is preferably oriented at the appropriate Brewster angle.

The chemical reactions that are suitable for laser amplification are those that yield products of predetermined excitation in an energy level system suitable for stimulated emission; and wherein these excited species live long enough to be the subject of stimulated emission of the desired photons. Numerous reactions supply energy by the making or breaking of chemical bonds and may be of the association, dissociation, or exchange types of reactions.

The reactions may be self-initiating, catalytically initiated, heat initiated, or triggered by a spark or a flash of light. In the heat initiated reactions, the stack of discs of the example of the latter FIGS. may be heated by flowing a hot fluid through the heat exchange tubes to serve as thermal reaction initiating means. When the reaction is initiated simply on mixing, one reactant is fed through the auxiliary gas supply means. Again, reaction is initiated immediately adjacent the optical cavity.

The auxiliary gas can also be a material with an energy level closely matched to the lower energy level of the reacting species and which quenches this level by absorbing its energy by collision transfer. Another class of substances that may remove these lower energy level species is that of particular auxiliary reactants that remove and quench this level by secondary chemical reactions therewith. Further substances that may be added through the auxiliary introduction means are coolant gases to decrease the mean kinetic energy of the system. Addition of these gases is indicated in reactions where the higher energy level is being preferentially depopulated by collision mechanisms.

The most intrinsically energetic reactions are of the exothermic type where part of the energy of the heat of reaction initially appears as vibrational energy. Chemically unstable compounds such as nitromethane ($CH_3NO_2$) can be decomposed into $CO_2 + CO + H_2O + N_2 + H_2$; or, alternatively, hydrogen peroxide may be decomposed into excited products. Other suitable reactions are the oxidation of hydrogen, carbon or carbon monoxide to water or carbon dioxide as applied to the last two cases. The latter reaction is presently preferred since it is more convenient to deal with a reaction where both reactants and products are in a gaseous state, although gas-borne vapors and particles may be effectively utilized in the apparatus of the invention.

The surface catalyzed recombination of N and O atoms on silver, copper, nickel or cobalt catalysts forms electronically excited NO atoms on the surface of the catalyst which diffuse into the gas phase. Known chemical processes resulting in population inversion are the mixing of $CO_2$ with active nitrogen produced in a high frequency discharge. This results in vibrationally excited CO. The reaction of atomic nitrogen with an organic compound produces electronically excited molecules in a state of population inversion. The reaction of H and NOC1 produces partial inversion in the resulting excited HC1 molecules and the photoinitiated dissociation of HC1 yields excited products which spontaneously emit infrared radiation. In such reactions, the apparatus of the invention may be utilized by "pumping" in an initial light pulse through the output window.

In summary, the apparatus of this invention provides for high flow rates and high volumes of excited reacting chemicals which react immediately adjacent the optical cavity and for a separate high flow rate of auxiliary gases which may be added to the already reacting chemicals. The mixture quickly flows across the optical cavity as the excited reaction products radiate to a lower energy state and are removed through an exhaust cylinder which also serves as thermal insulation. The invention permits chemical initiation by mixing, heat, light or catalytic action. Without exchanging the reflectors or reassembling the apparatus, the optical cavity may be variably focused or tuned during reaction by external adjustment of the position of curvature of the reflectors. The reflectors are protected from destruction or thermal expansion by cooling and further may be totally reflecting so that maximum radiation is retained in the cavity to amplify the radiation to the threshold of oscillation. This latter effect is possible since variable light output coupling means separate from the optical cavity reflectors are provided that may be moved gradually into or out of coupling relation with the reflecting radiation. Furthermore, the apparatus is totally sealed and otherwise provides complete insulation from the effects of the hot reacting gases.

There have thus been disclosed and described a number of examples of the structural aspects of a chemical laser which achieves the objects and exhibits the advantages set forth hereinabove.

I claim:

1. A chemical laser apparatus for causing lasing action of the radiating, chemically reacting mixture, said apparatus comprising:
   a. an elongate, substantially closed vessel;
   b. a pair of aligned, annular reflectors disposed substantially at the ends of said closed vessel for repeatedly reflecting the radiation of said reacting mixture and defining an optical cavity of substantially annular shape having a central axis;
   c. cylindrical conduit means enclosing said axis and having openings therein for permitting said reacting mixture to enter said optical cavity in a direction substantially transverse to said axis, whereby said mixture is permitted to react within said optical cavity, said optical cavity surrounding said conduit means; and
   d. an elongate annular chamber disposed concentrically to said axis for rapidly removing the reacted chemical mixture from said optical cavity.

2. Laser apparatus as defined in claim 1, wherein a plurality of spaced annular plates is provided, each of said plates extending laterally from said conduit means, and each including a catalyst for said chemical mixture.

3. Laser apparatus as defined in claim 2 wherein a perforated pipe of helical shape is provided, said pipe being spaced about said conduit means and said annular plates for supplying an auxiliary supply of the reactant into said optical cavity.

4. Laser apparatus as defined in claim 1 wherein means is provided for cooling said reflectors.